United States Patent
Yano et al.

(10) Patent No.: US 7,349,198 B2
(45) Date of Patent: Mar. 25, 2008

(54) SOLID ELECTROLYTIC CAPACITOR AND METHOD FOR MANUFACTURING SAME

(75) Inventors: Mutsumi Yano, Hirakata (JP); Kazuhiro Takatani, Takatsuki (JP); Mamoru Kimoto, Hirakata (JP)

(73) Assignee: Sanyo Electric Co., Ltd., Moriguchi (JP)

(*) Notice: Subject to any disclaimer, the term of this patent is extended or adjusted under 35 U.S.C. 154(b) by 255 days.

(21) Appl. No.: 10/542,303

(22) PCT Filed: Dec. 21, 2004

(86) PCT No.: PCT/JP2004/019056

§ 371 (c)(1),
(2), (4) Date: Jul. 15, 2005

(87) PCT Pub. No.: WO2005/076297

PCT Pub. Date: Aug. 18, 2005

(65) Prior Publication Data

US 2006/0133014 A1 Jun. 22, 2006

(30) Foreign Application Priority Data

Feb. 4, 2004 (JP) ............................. 2004-028170
Sep. 30, 2004 (JP) ............................. 2004-289282

(51) Int. Cl.
  *H01G 5/013* (2006.01)
  *H01G 4/06* (2006.01)
(52) U.S. Cl. .................................... 361/524; 29/25.03
(58) Field of Classification Search ........ 361/524–525; 29/25.03
See application file for complete search history.

(56) References Cited

U.S. PATENT DOCUMENTS

| 6,215,652 | B1 | 4/2001 | Yoshida et al. |
| 6,956,732 | B1* | 10/2005 | Yano et al. ............... 361/524 |
| 7,038,902 | B2* | 5/2006 | Takatani et al. ........... 361/524 |
| 2006/0133014 | A1* | 6/2006 | Yano et al. ............... 361/524 |

FOREIGN PATENT DOCUMENTS

| JP | 2-277212 | 11/1990 |
| JP | H0 2-277212 | 11/1990 |
| JP | H-06-060436 | 8/1994 |
| JP | 11-329902 | 11/1999 |
| JP | 2000-252169 | 9/2000 |
| JP | 2003-073900 | 3/2003 |
| JP | 2003-158044 | 5/2003 |
| WO | WO 2005/076297 A1 | 8/2005 |

OTHER PUBLICATIONS

Notification of Reasons for Refusal issued for Japanese application No. 2004-289282, with English translation.

* cited by examiner

*Primary Examiner*—Eric Thomas
(74) *Attorney, Agent, or Firm*—Westerman, Hattori, Daniels & Adrian, LLP.

(57) ABSTRACT

A solid electrolytic capacitor having less occurrence of leakage current and a fabrication method therefor. In a solid electrolytic capacitor, a dielectric layer of niobium oxide having high electrical insulation whose major component is niobium or oxygen, an electrolyte layer and a cathode are formed in the order on an anode formed of niobium or niobium alloy, the dielectric layer is composed of a first dielectric layer containing fluorine formed on the anode and a second dielectric layer containing phosphorus or sulfur formed on the first dielectric layer and fluorine concentration in the first dielectric layer is decreased from the anode side toward the second dielectric layer.

8 Claims, 4 Drawing Sheets

ND METHOD FOR MANUFACTURING SAME

SOLID ELECTROLYTIC CAPACITOR AND METHOD FOR MANUFACTURING SAME

TECHNICAL FIELD

The present invention relates to a solid electrolytic capacitor and fabrication method therefor.

BACKGROUND ART

Recently, miniaturization of electronic machines has been bringing a demand for development of small-sized capacitors having a large capacity.

As one of such capacitors having a large capacity, solid electrolytic capacitors with a high capacitance, using as a dielectric material an amorphous niobium oxide whose electrical insulation is high and dielectric constant is 1.8 times higher than that of tantalum oxide of a material used for conventional solid electrolytic capacitors, have been focused on.

Unfortunately, the conventional solid electrolytic capacitors using niobium oxide as the dielectric material have problems that they are easily affected by heat-treatment, such as a reflow soldering process and their capacitance stability is easily deteriorated compared with solid electrolytic capacitors using another dielectric materials such as tantalum oxide.

In order to solve such a problem, there has been proposed a solid electrolytic capacitor in which a dielectric layer is composed of niobium oxide wherein a niobium nitride region is formed (for example, see Japanese Published Unexamined Patent Application No.11-329902).

However, even in such a solid electrolytic capacitor in which the dielectric layer is composed of niobium oxide wherein the niobium nitride region is formed, one part of the amorphous niobium oxide is crystallized by the heat-treatment, such as the reflow soldering process. As a consequence, a crystal of niobium oxide with a decreased electrical insulation is contained in the dielectric layer, and the electrical insulation of the dielectric layer is decreased.

Further, volume change occurs in niobium oxide in accordance with change of state thereof from being amorphous to crystal. Then, a crack in the dielectric layer is easily occurred due to crystallization of niobium oxide. Thus, there has been a problem that short circuit between an anode and a cathode formed on the surface of the dielectric layer is easily occurred.

Still further, the solid electrolytic capacitor in which the dielectric layer is composed of niobium oxide wherein the niobium nitride region is formed has problems that diffusion of oxygen is not fully suppressed and thickness of the dielectric layer is easily decreased.

As a consequence, a problem with the conventional solid electrolytic capacitors has been that it impossible to sufficiently reduce leakage current between the anode and the cathode.

DISCLOSURE OF THE INVENTION

Problems to be Solved

The invention is directed to a solution to the aforementioned problems with the solid electrolytic capacitor in which the dielectric layer is composed of niobium oxide.

Specifically, the invention has an object to provide a solid electrolytic capacitor in which the dielectric layer is composed of niobium oxide having less occurrence of leakage current and a fabrication method therefor.

Solution to the Problems

In order to solve the problems mentioned above, a solid electrolytic capacitor according to the present invention comprises: an anode formed of niobium or niobium alloy; a first dielectric layer containing niobium and oxygen whose major component is niobium or oxygen formed on the anode; a second dielectric layer containing phosphorus or sulfur in addition to niobium and oxygen formed on the first dielectric layer and a cathode formed on the second dielectric layer. The aforesaid niobium and oxygen forms niobium oxide, therefore, the first dielectric layer is composed of niobium oxide whose major component is niobium or oxygen and the second dielectric layer is composed of niobium oxide containing phosphorus or sulfur.

In the solid electrolytic capacitor of the present invention, phosphorus or sulfur is contained in the second dielectric layer which is one of the dielectric layer composed of niobium oxide and is located on the cathode side (the face side), so that crystallization of niobium oxide in the second dielectric layer is restrained by phosphorus or sulfur.

Therefore, even if heat-treatment of the reflow soldering process and the like is conducted, generation of crystalline niobium oxide with a decreased electrical insulation in the second dielectric layer located on the cathode side (the face side) is restrained, so that a decrease in the electrical insulation of the dielectric layer on the face side is prevented. Further, volume change in accordance with crystallization of niobium oxide is suppressed, and therefore, an occurrence of a crack on the surface of the dielectric layer is restrained. Thus, the aforesaid second dielectric layer functions as a surface protective layer of the dielectric layer. As a consequence of restraint of the crack on the surface of the dielectric layer as described above, the crack extending to the inside of the dielectric layer is also restrained and a short circuit between the anode and the cathode is suppressed.

As a consequence, with the solid electrolytic capacitor of the present invention, the decrease in the electrical insulation of the dielectric layer and the crack on the dielectric layer are restrained, so that occurrence of the leakage current is remarkably reduced.

In the solid electrolytic capacitor of the present invention, it is preferable that fluorine is contained in the first dielectric layer. The reason is that when fluorine is contained in the first dielectric layer, as the same as phosphorus or sulfur, the crystallization of niobium oxide is restrained and the occurrence of the leakage current in the solid electrolytic capacitor is further reduced.

Moreover, in cases where fluorine is contained in the first dielectric layer, it is preferable that fluorine concentration is increased toward the anode side from the cathode side. By such a way, the fluorine concentration on the anode side becomes higher, and as a result, a region containing niobium fluoride is easily formed on parts of the anode side of the first dielectric layer. Further, because it becomes difficult to diffuse oxygen in the region of niobium oxide containing niobium fluoride, diffusion of oxygen from the dielectric layer to the anode is suppressed when the aforesaid region containing niobium fluoride is formed at a boundary face of the dielectric layer and the anode. Thus, a decrease of thickness of the dielectric layer resulted from a decrease of oxygen in the dielectric layer is prevented, so that the decrease in the electrical insulation of the dielectric layer is suppressed.

A fabrication method for the solid electrolytic capacitor of the present invention comprises steps of: forming the first dielectric layer whose major component is niobium or oxygen by anodizing the anode of niobium or niobium alloy in a first aqueous solution; forming the second dielectric layer containing phosphorus or sulfur in addition to niobium and oxygen on the first dielectric layer by anodizing the anode formed with the first dielectric layer in a second aqueous solution containing phosphate ion or sulfate ion; and forming the cathode on the second dielectric layer.

In the fabrication method for the solid electrolytic capacitor of the present invention, the anode formed with the first dielectric layer is anodized in the second aqueous solution containing phosphate ion or sulfate ion, and therefore, phosphorus or sulfur is contained in the second dielectric layer located on the cathode side (the face side), so that the crystallization of niobium oxide does not occur easily and the decrease of the electrical insulation on the face side of the dielectric layer is restrained preventing the clack on the surface of the dielectric layer and the short circuit between the anode and the cathode is suppressed.

As a consequence, according to the fabrication method for the solid electrolytic capacitor of the present invention, the decrease of the electrical insulation of the dielectric layer is restrained preventing the crack on the dielectric layer, and therefore, a solid electrolytic capacitor having less occurrence of leakage current can be easily fabricated.

Further, it is preferable that an aqueous solution containing fluoride ion is used as the first aqueous solution in the fabrication method for the solid electrolytic capacitor of the present invention. In cases where the anode of niobium or niobium alloy is anodized in the first aqueous solution containing fluoride ion, fluorine is contained in the first dielectric layer. As a consequence, the crystallization of niobium oxide in the first dielectric layer is restrained by fluorine and the occurrence of the leakage current in the solid electrolytic capacitor is further reduced.

Moreover, in cases where the anode of niobium or niobium alloy is anodized in the first aqueous solution containing fluoride ion as described above, the fluorine concentration becomes high on the anode side and the region containing niobium fluoride is formed on the parts of the anode side of the first dielectric layer, and as a result, the diffusion of oxygen from the dielectric layer to the anode is suppressed. Thus, the decrease of the thickness of the dielectric layer resulted from the decrease of oxygen in the dielectric layer is prevented restraining the decrease of the electrical insulation of the dielectric layer and the occurrence of the leakage current in the solid electrolytic capacitor is further reduced.

Further, in cases where the anode of niobium or niobium alloy is anodized in the first aqueous solution containing fluoride ion, the fluoride ion dissolves the surface of the anode of niobium or niobium alloy and uneven shapes are formed on the surface of the anode, so that the surface area of the anode is increased. Where capacitance C is proportional to the surface area of the anode, equivalent series resistance (ESR) in high frequency regions is proportional to $1/(2\pi fC)^{1/2}$ in the case that frequency is represented by f. Therefore, when the surface area of the anode is increased as described above, the capacitance is increased and the equivalent series resistance (ESR) in high frequency regions is reduced.

BEST MODES FOR CARRYING OUT THE INVENTION

A solid electrolytic capacitor and fabrication method therefor according to the invention will hereinbelow be described in details with reference to the accompanying drawings. It is to be noted that the solid electrolytic capacitor and fabrication method therefor of the invention is not limited by those illustrated in the following embodiments and may be practiced in modifications thereof as required so long as such modifications do not deviate from the scope of the invention.

FIG. 1 is a structural cross-sectional view of a solid electrolytic capacitor according to an embodiment of the present invention.

In a solid electrolytic capacitor 100 according to the embodiment, a dielectric layer 2 of niobium oxide with high electrical insulation is formed on the surface of an anode 1 of a porous sintered body prepared by sintering and molding niobium particles in a vacuum for covering the circumference of the anode 1 as shown in FIG. 1.

The aforesaid dielectric layer 2 is composed of a first dielectric layer 21 formed on the anode 1 for covering the circumference of the anode 1 and a second dielectric layer 22 formed on the first dielectric layer 21 for covering the circumference of the first dielectric layer 21.

The aforesaid first dielectric layer 21 contains fluorine and fluorine concentration becomes lower toward the side of the second dielectric layer 22 from the anode 1 side. The second dielectric layer 22 contains phosphorus or sulfur.

Further, an electrolyte layer 3 is formed on the dielectric layer 2 for covering the circumference of the dielectric layer 2. As materials for the electrolyte layer 3, conducting polymer such as polypyrrole and polythiophene, and manganese dioxide and the like are used.

A cathode 4 is formed on the electrolyte layer 3 for covering the circumference of the electrolyte layer 3. The aforesaid cathode 4 is composed of a first conducting layer 4a formed for covering the circumference of the electrolyte layer 3 and a second conducting layer 4b formed for covering the circumference of the first conducting layer 4a. Further, carbon paste or the like is used for the first conducting layer 4a and silver particles and silver paste consisting of protecting colloid and organic solvent are used for the second conducting layer 4b. The protective colloid is hydrophilic colloid which is added in order to increase stability of hydrophobic colloid to an electrolyte (According to Physics and Chemistry Dictionary, Fifth edition P.1300, Iwanami syoten).

Further, a conducting adhesive layer 5 is formed on the one face of the cathode 4 (corresponding to the top face in FIG. 1) and a cathode terminal 6 is connected to the cathode 4 via the conducting adhesive layer 5.

On the other hand, one part of an anode lead 1a is embedded in the anode 1. An anode terminal 7 is connected to one end part of the anode lead 1a protruding throughout the dielectric layer 2 by welding.

Further, a mold outer resin 8 is provided on the circumference of the solid electrolytic capacitor for thrusting one end of the cathode terminal 6 and that of the anode terminal 7 outside.

Next, a fabrication method for the solid electrolytic capacitor 100 shown in FIG. 1 will be described as follows.

One part of the anode lead 1a is embedded in niobium powder molded in the fixed shape. Under such a condition, the niobium powder is sintered to form the anode 1 of porous sintered body of niobium in which one part of the anode lead 1a is embedded. In this case, niobium particles in the porous sintered body are mutually bonded.

Then, the anode 1 is anodized in a first aqueous solution containing fluoride ion, for example, an aqueous solution containing ammonium fluoride, so that the first dielectric layer 21 of niobium oxide containing fluorine is formed for covering the circumference of the anode 1. In this case, the fluorine concentration becomes lower toward the face side of the first dielectric layer 21 (the side of the second dielectric layer 22) from the anode 1 side.

Next, the anode 1 formed with the first dielectric layer 21 is anodized in a second aqueous solution. The second aqueous solution is the aqueous solution containing phosphate ion, for example, phosphate solution or the aqueous solution containing sulfate ion, for example, sulfate solution. Thus, the second dielectric layer 22 of niobium oxide containing phosphorus or sulfur is formed for covering the circumference of the first dielectric layer 21. As a result, the dielectric layer 2 whose main component is niobium oxide with high electrical insulation composed of the first dielectric layer 21 and the second dielectric layer 22 disposed in the order on the surface of the anode 1 is formed.

Then, the electrolyte layer 3 comprising the conducting polymer such as polypyrrole and polythiophene, and manganese dioxide and the like is formed for covering the circumference of the dielectric layer 2. In forming the electrolyte layer 3 comprising the conducting polymer, various polymerization processes can be applied. In forming the electrolyte layer 3 comprising manganese dioxide, pyrolysis process can be applied. In cases where the electrolyte layer 3 is formed in the manner as described above, the electrolyte layer 3 is formed on the surface of the dielectric layer 2 for filling spaces of the dielectric layer 2 on the surface of the porous sintered body of the anode 1.

Then, carbon paste or the like is applied on the electrolyte layer 3 and dried at fixed temperature to form the first conducting layer 4a for covering the circumference of the electrolyte layer 3. Further, silver paste or the like is applied on the first conducting layer 4a and being dried at the fixed temperature to form the second conducting layer 4b for covering the circumference of the first conducting layer 4a. Thus, the cathode 4 composed of the first conducting layer 4a and the second conducting layer 4b is formed.

Next, a conducting adhesive agent is applied on the cathode terminal 6. The cathode 4 and the cathode terminal 6 are contacted via the conducting adhesive agent. Under such a circumstance, the conducting adhesive agent is dried to form the conducting adhesive layer 5 and the cathode 4 and the cathode terminal 6 are connected each other via the conducting adhesive layer 5.

The anode terminal 7 is connected on the anode lead 1a protruding from the dielectric layer 2, the electrolyte layer 3 and the cathode 4 by welding.

After that, the mold outer resin 8 is formed on the circumference of the cathode 4, the cathode terminal 6 and the anode terminal 7 for thrusting the one end of the cathode terminal 6 and that of the anode terminal 7 outside. Thus, the solid electrolytic capacitor 100 is fabricated.

In the solid electrolytic capacitor 100 according to the embodiment, the second dielectric layer 22 composed of niobium oxide containing phosphorus or sulfur is formed on the face side of the dielectric layer 2, that is, the side where the electrolyte layer 3 and the cathode 4 are formed, so that generation of crystalline niobium oxide with a decreased electrical insulation in the second dielectric layer 22 is restrained even if heat-treatment of the reflow soldering process and the like is conducted. As a consequence, a decrease in the electrical insulation of the second dielectric layer 22 on the face side of the dielectric layer 2 is prevented.

Thus, crystallization of niobium oxide in the second dielectric layer 22 is restrained and occurrence of a crack on the surface of the second dielectric layer 22 is prevented. As a consequence, the crack extending to the inside of the dielectric layer 2 is also restrained and a short circuit between the anode 1 and the cathode 4 is suppressed.

Therefore, according to the embodiment, the decrease of the electrical insulation of the dielectric layer 2 is restrained and the solid electrolytic capacitor 100 having less occurrence of leakage current can be obtained.

In the solid electrolytic capacitor 100 according to the embodiment, fluorine having an effect of restraining the crystallization of niobium oxide is contained in the first dielectric layer 21, therefore it is possible to further reduce the occurrence of the leakage current.

Moreover, because fluorine concentration is increased toward the anode 1 side from the cathode 4 side, the fluorine concentration on the anode 1 side in the first dielectric layer 21 becomes higher. Thus, a region containing niobium fluoride is easily formed at a boundary face of the first dielectric layer 21 and the anode 1. Further, because the region containing niobium fluoride is formed at the boundary face of the first dielectric layer 21 and the anode 1 has a function of suppressing diffusion of oxygen from the first dielectric layer 21 to the anode 1, a decrease of oxygen in the dielectric layer 2 is suppressed. As a consequence, a decrease of thickness of the dielectric layer 2 is prevented and a decrease in electrical insulation of the dielectric layer 2 is restrained, so that the occurrence of the leakage current is reduced.

In the embodiment, the anode 1 formed with the first dielectric layer 21 is anodized in the second aqueous solution containing phosphate ion or sulfate ion, therefore phosphorus or sulfur is contained in the second dielectric layer 22 which is of the dielectric layer 2 composed of the first dielectric layer 21 and the second dielectric layer 22 comprising niobium oxide and is located on the face side where the electrolyte layer 3 and the cathode 4 are formed.

As phosphorus or sulfur is contained in the second dielectric layer 22 located on the face side of the dielectric layer 2, the crystallization of niobium oxide does not occur easily and the decrease of the electrical insulation on the surface of the dielectric layer is restrained.

Further, as the crystallization of niobium oxide in the dielectric layer 2 is restrained, the occurrence of the crack on the surface of the dielectric layer 2 is prevented. Therefore, the crack extending to the inside of the dielectric layer 2 is also prevented and the short circuit between the anode 1 and the cathode 4 is suppressed.

As described above, the decrease of the electrical insulation of the dielectric layer 2 is restrained and the occurrence of the crack on the dielectric layer 2 is prevented. Thus, the solid electrolytic capacitor 100 having less occurrence of the leakage current can be obtained.

Then, in the embodiment, as the anode 1 of niobium is anodized in the first aqueous solution containing fluoride ion to form the first dielectric layer 21, fluorine is easily contained in the first dielectric layer 21. Thus, the crystallization of niobium oxide in the first dielectric layer 21 is restrained because of fluorine contained as described above.

Moreover, in the cases where the first dielectric layer 21 is formed as described above, fluorine concentration is increased toward the anode 1 side from the cathode 4 side and the fluorine concentration on the anode 1 side of the first dielectric layer 21 becomes higher. Thus, the region containing niobium fluoride having the function of suppressing the diffusion of oxygen from the dielectric layer 2 to the anode 1 is easily formed at the boundary face of the dielectric layer 2 and the anode 1. As a consequence, the decrease of oxygen in the dielectric layer 2 is restrained and the decrease of the thickness of the dielectric layer 2 is prevented, so that the occurrence of the leakage current is reduced.

Further, in the cases where the anode 1 of niobium is anodized in the first aqueous solution containing fluoride ion, the fluoride ion dissolves the surface of the anode 1 of niobium and uneven shapes are formed on the surface of the anode 1. As a consequence, the surface area of the anode 1 is increased and the capacitance of the solid electrolytic capacitor 100 is increased, so that the equivalent series resistance (ESR) in high frequency regions is reduced.

In the embodiment, because the anode 1 is composed of the porous sintered body, it has a large surface area and a large capacity can be obtained. The porous sintered body is used as the anode 1 in the embodiment as described above, however, the description shall not be construed to limit the type of the anode, and for example, a metal leaf of niobium may be used as the anode in the present invention. As materials for the anode 1, not only niobium as an element, but also niobium alloy containing elements such as tungsten, vanadium, zinc, aluminum, molybdenum, hafnium and zirconium can be used.

Further, in the embodiment, the electrolyte layer 3 is formed between the dielectric layer 2 and the cathode 4, however, the solid electrolytic capacitor of the present invention shall not be limited by the above description and it is possible to form the cathode 4 directly on the dielectric layer 2 without formation of the electrolyte layer 3.

EXAMPLES

Hereinafter, a solid electrolytic capacitor according to examples of the present invention will specifically be described while comparative examples will be cited to demonstrate that the examples of the inventive solid electrolytic capacitor are improved in remarkable reduction of leakage current.

Example 1

FIG. 2 shows an illustrative view of a solid electrolytic capacitor of Example 1 and evaluation method thereof. In Example 1, a solid electrolytic capacitor A is fabricated by the method described as follows.

A porous sintered body of niobium, which is about 2.8 mm. high, about 3.3 mm. wide and about 1.7 mm. deep formed for embedding one part of an anode lead 1a therein was used as an anode 1 in Example 1.

The anode 1 was anodized at a constant voltage of about 10 V in an aqueous solution containing about 0.5 wt % of ammonium fluoride (concentration of fluoride ion: about 0.05 wt %) kept at about 60° C. for about 2 hours to form a first dielectric layer 21 for covering the circumference of the anode 1. The aforesaid aqueous solution containing ammonium fluoride is one example of a first aqueous solution containing fluoride ion.

Next, the anode 1 formed with the first dielectric layer 21 was anodized at the constant voltage of about 10 V in about 0.5 wt % of phosphate solution kept at about 60° C. for about 2 hours to form a second dielectric layer 22 for covering the circumference of the first dielectric layer 21. The aforesaid phosphate solution is one example of a second aqueous solution containing phosphate ion.

Thus, a dielectric layer 2 composed of the first dielectric layer 21 and the second dielectric layer 22 was formed for covering the circumference of the anode 1.

Next, an electrolyte layer 3 of polypyrrole was formed by polymerization process for covering the circumference of the dielectric layer 2.

Then, a first conducting layer 4a is formed by applying carbon paste or the like on the circumference of the electrolyte layer 3 and being dried at fixed temperature and the second conducting layer 4b is formed by applying silver paste or the like on the circumference of the first conducting layer 4a and being dried at the fixed temperature. Further, a cathode 4 composed of the first conducting layer 4a and the second conducting layer 4b was formed on the electrolyte layer 3. Thus fabricated was the solid electrolytic capacitor A of Example 1.

Comparative Example 1

In Comparative Example 1, a solid electrolytic capacitor X1 was fabricated in the same manner as in Example 1 except that the step of forming the second dielectric layer 22 of Example 1 was omitted. In other words, a dielectric layer is composed of only the first dielectric layer in the solid electrolytic capacitor X1 of Comparative Example 1.

Comparative Example 2

In Comparative Example 2, a solid electrolytic capacitor X2 was fabricated in the same manner as in Example 1 except that the step of forming the first dielectric layer 21 of Example 1 was omitted and time for anodic oxidation for forming the second dielectric layer 22 was changed to about 10 hours. In other words, a dielectric layer was composed of only the second dielectric layer in the solid electrolytic capacitor X2 of Comparative Example 2.

Comparative Example 3

In Comparative Example 3, a solid electrolytic capacitor X3 was fabricated in the same manner as in Example 1 except that the step of forming the second dielectric layer 22 of Example 1 was omitted as the same as Comparative Example 1 and about 0.5 wt % of hydrochloric acid was used instead of the aqueous solution containing 0.5 wt % of ammonium fluoride as the first aqueous solution. In the solid electrolytic capacitor X3 of Comparative Example 3, a dielectric layer is composed of only the first dielectric layer and fluorine is not contained in the dielectric layer.

Comparative Example 4

In Comparative Example 4, a solid electrolytic capacitor X4 was fabricated in the same manner as in Comparative Example 2 except that the step of forming the first dielectric layer 21 of Example 1 was omitted as the same as Comparative Example 2 and the anode 1 used in Example 1 was heat-treated in nitrogen ambient of about 300 Torr (about $4 \times 10^{-4}$ Pa) at about 600° C. for about 5 minutes.

In cases where the anode of niobium was heat-treated in nitrogen ambient as described above, a layer of niobium nitride was formed on the anode.

A second dielectric layer was formed as the same as in Example 1 on the anode wherein the layer of niobium nitride was formed. Thus, the dielectric layer of niobium oxide composed of a niobium nitride region was formed on the anode.

The solid electrolytic capacitor X4 of Comparative Example 4 corresponds to the solid electrolytic capacitor disclosed in Japanese Published Unexamined Patent Application No.11-329902 cited above.

In the solid electrolytic capacitor A of Example 1, at the stage of forming the dielectric layer 2 composed of the first dielectric layer 21 and the second dielectric layer 22 for covering the circumference of the anode 1, the dielectric layer 2 was analyzed by ESCA (Electron Spectroscopy for Chemical Analysis). The results are shown in FIG. 3. In FIG. 3, vertical axis shows content of elements in the anode 1 and the dielectric layer 2 and horizontal axis shows sputtering time. The sputtering time is proportional to a position in thickness direction and sputtering depth per minute of the sputtering time is about 10 nm.

As shown in FIG. 3, the dielectric layer 2 of the solid electrolytic capacitor A of Example 1 is composed of niobium oxide whose major component is niobium (Nb) and oxygen (O). In other words, the dielectric layer 2 contains niobium (Nb) and oxygen (O) and is composed of niobium oxide whose major component is one element of either of niobium (Nb) or oxygen (O).

In the dielectric layer 2, three regions (i), (ii) and (iii) exist in the order from the face side (the opposite side of the anode).

The region (i) of the face side of the dielectric layer 2 where the electrolyte layer 3 is formed is 1 nm thick containing niobium and oxygen and composed of niobium oxide whose major component is oxygen. Further, in the region (i), about 2.5 atomic % at the maximum of phosphorus (P) is contained while about 0.5 atomic % or less of fluorine (F) is contained. As a result, the region (i) is conceivably the second dielectric layer 22. In the region (i), the phosphorus (P) concentration becomes higher in the face side and becomes lower toward the anode 1 side.

The region (ii) is on the inside of the region (i) (the anode 1 side). The region (ii) is 15 nm thick containing niobium and oxygen and composed of niobium oxide whose major component is oxygen. The region (iii) is on the inside of the region (ii). The region (iii) is about 11 nm thick containing niobium and oxygen and composed of niobium oxide whose major component is niobium.

Fluorine (F) is contained in both of the region (ii) and the region (iii) while phosphorus (P) is not contained therein. Therefore, the regions (ii) and (iii) are conceivably the first dielectric layer 21. In the region (ii), fluorine (F) is contained at almost uniform concentration of about 0.5 atomic % to depth direction. On the other hand, in the region (iii), the fluorine concentration is increased from the region (ii) side toward the anode 1 side. Thus, the fluorine concentration in the first dielectric layer 21 composed of the regions (ii) and (iii) is increased from the region (i) side toward the anode 1 side. Further, as the region (iii) contains about 1.8 atomic % at the maximum of fluorine, the region (iii) conceivably contains niobium fluoride. Still further, fluorine (F) inside of the anode 1 is conceivably diffused from the first dielectric layer 21 composed of the regions (ii) and (iii).

FIG. 4 is a SEM photograph showing the surface of the dielectric layer 2 composed of the first dielectric layer 21 and the second dielectric layer 22 formed for covering the circumference of the anode 1 in the solid electrolytic capacitor A of Example 1. FIG. 5 is a SEM photograph showing the surface of the dielectric layer of niobium oxide composed of the niobium nitride region formed on the anode in the solid electrolytic capacitor X4 of Comparative Example 4.

As shown in FIG. 4, in the solid electrolytic capacitor A of Example 1, uneven shape was generated on the surface of the dielectric layer 2. In contrast, as shown in FIG. 5, the surface of the dielectric layer in the solid electrolytic capacitor X4 of Comparative Example 4 was comparatively flat and smooth. This is believed to be because the aqueous solution containing ammonium fluoride was used in the step for forming the first dielectric layer 21 in the solid electrolytic capacitor A of Example 1, the surface of the anode 1 of niobium was dissolved due to fluoride ion in the aqueous solution containing ammonium fluoride and the uneven shape was generated.

The resultant solid electrolytic capacitor A of Example 1 and the resultant solid electrolytic capacitors X1 to X4 of Comparative Examples 1 to 4 were each determined for leakage current after heat-treatment and equivalent series resistance (ESR) in high frequency regions.

In determining for leakage current after heat-treatment, each of the resultant solid electrolytic capacitor A of Example 1 and the resultant solid electrolytic capacitors X1 to X4 of Comparative Examples 1 to 4 was heat-treated in a drying furnace of which temperature was set to about 250° in the air for 10 minutes. The set temperature in the drying furnace measured by a thermocouple attached to vicinity of a sample holding tool provided in the drying furnace.

Next, as shown in FIG. 6, in each of the resultant solid electrolytic capacitor A and the resultant solid electrolytic capacitors X1 to X4 after heat-treatment, constant voltage of about 5 V was applied between the anode lead 1$a$ in the anode 1 and the cathode 4 and the leakage current after about 20 seconds was measured. Further, each equivalent series resistance (ESR) between the anode lead 1$a$ and the cathode 4 was determined by means of LCR meter at about a frequency of 100 kHz.

Numbers of leakage current and ESR in each of the solid electrolytic capacitors were determined on a basis of the determined leakage current and ESR in the solid electrolytic capacitor A of Example 1 defined as 100. The results are shown in Table 1 below.

TABLE 1

|  | leakage current | ESR |
| --- | --- | --- |
| solid electrolytic capacitor A | 100 | 100 |
| solid electrolytic capacitor X1 | 500 | 100 |
| solid electrolytic capacitor X2 | 1000 | 200 |
| solid electrolytic capacitor X3 | 2000 | 200 |
| solid electrolytic capacitor X4 | 980 | 200 |

As shown in the table 1, the leakage current of the solid electrolytic capacitor X1 of Comparative Example 1 was generated about five times as much as that of the solid electrolytic capacitor A of Example 1. Further, the leakage current of the solid electrolytic capacitor X2 of Comparative Example 2 was generated about 10 times as much as that of the solid electrolytic capacitor A of Example 1, the leakage current of the solid electrolytic capacitor X3 of Comparative Example 3 was generated about 20 times as much as that of the solid electrolytic capacitor A of Example 1 and the leakage current of the solid electrolytic capacitor X4 of Comparative Example 4 was generated about 9.8 times as much as that of the solid electrolytic capacitor A of Example 1. As a result, the leakage current of the solid electrolytic capacitor A of Example 1 was notably decreased as compared with the solid electrolytic capacitors X1 to X4 of Comparative Examples 1 to 4.

Further, ESR in each of the solid electrolytic capacitor A of Example 1 and the solid electrolytic capacitor X1 of Comparative Example 1 wherein the dielectric layer was formed by anodize in the aqueous solution containing ammonium fluoride was notably decreased as compared with ESR in each of the solid electrolytic capacitors X2 to X4 of Comparative Examples 2 to 4 wherein the dielectric layer anodized in the aqueous solution containing ammonium fluoride was not formed.

Example 2

In Example 2, a relation between the first aqueous solution used for forming the first dielectric layer and the leakage current was searched.

In Example 2, three types of solid electrolytic capacitors B1 to B3 were fabricated in the same manner as Example 1 except that three types of aqueous solutions, an aqueous solution containing 0.16 wt % of potassium fluoride, an aqueous solution containing 0.11 wt % of sodium fluoride and an aqueous solution containing 0.05 wt % of fluoric acid were used as each first aqueous solution instead of the aqueous solution containing 0.5 wt % of ammonium fluoride used as the first aqueous solution in the step of forming the first dielectric layer 21. The concentration of fluoride ion is about 0.05 wt % in every aqueous solution of the aforesaid three aqueous solutions. The aforesaid aqueous solution containing potassium fluoride, the aforesaid aqueous solution containing sodium fluoride or the aforesaid aqueous solution containing fluoric acid is one of examples of the first aqueous solution containing fluoride ion.

As the same manner in Example 1, each of the solid electrolytic capacitors B1 to B3 was analyzed by ESCA. The result of analyze by ESCA showed that the dielectric layer 2 wherein the first dielectric layer 21 containing fluorine and the second dielectric layer 22 containing phosphorus disposed in the order was formed on the anode 1 in each of the solid electrolytic capacitors B1 to B3.

Further, leakage current after heat-treatment in each of the solid electrolytic capacitors B1 to B3 was determined as the same manner in Example 1. Then, a number of the leakage current of each of the solid electrolytic capacitors B1 to B3 was determined on the basis of the determined leakage current of the solid electrolytic capacitor A of Example 1 defined as 100. The results are shown in Table 2 below.

TABLE 2

|  | leakage current |
| --- | --- |
| solid electrolytic capacitor B1 | 103 |
| solid electrolytic capacitor B2 | 103 |
| solid electrolytic capacitor B3 | 105 |
| solid electrolytic capacitor A | 100 |

As shown in the table, as the same as the solid electrolytic capacitor A of Example 1, the leakage current of each of the solid electrolytic capacitors B1 to B3 was notably decreased as compared with that of the solid electrolytic capacitors X1 to X4 of Comparative Examples 1 to 4.

As a result, it was found out that the same results were obtained even if the aqueous solution containing potassium fluoride, the aqueous solution containing sodium fluoride or the aqueous solution containing fluoric acid was used as the first aqueous solution instead of the aqueous solution containing ammonium fluoride. Further, it is believed to obtain the same results even if other aqueous solutions containing fluoride ion are used. When comparing among the solid electrolytic capacitors A and B1 to B3, the solid electrolytic capacitor A of Example 1 using the aqueous solution containing ammonium fluoride as the first aqueous solution provided the lowest leakage current.

Example 3

In Example 3, a solid electrolytic capacitor C was fabricated in the same manner as in Example 1 except that an anode of porous sintered body of niobium alloy prepared by sintering a mixture of niobium and aluminum mixed in a weight ratio of 99:1 was used instead of the anode 1 of the porous sintered body of niobium.

As the same manner in Example 1, the solid electrolytic capacitor C was analyzed by ESCA. The result of analyze by ESCA showed that the dielectric layer 2 wherein the first dielectric layer 21 containing fluorine and the second dielectric layer 22 containing phosphorus disposed in the order was formed on the anode 1 in the solid electrolytic capacitor C.

Further, leakage current after heat-treatment in the solid electrolytic capacitor C was determined as the same manner in Example 1. Then, the number of leakage current of the solid electrolytic capacitor C was determined on the basis of the determined leakage current of the solid electrolytic capacitor A of Example 1 defined as 100. The results are shown in Table 3 below.

TABLE 3

|  | leakage current |
| --- | --- |
| solid electrolytic capacitor C | 97 |
| solid electrolytic capacitor A | 100 |

As shown in the table, as the same as the solid electrolytic capacitor A of Example 1, the leakage current of the solid electrolytic capacitor C of Example 3 using the porous sintered body of niobium alloy as the anode 1 was notably decreased as compared with the solid electrolytic capacitors X1 to X4 of Comparative Examples 1 to 4. As a result, it is possible to use niobium alloy, in addition to niobium element, as the anode material.

Example 4

In Example 4, a solid electrolytic capacitor D was fabricated in the same manner as in Example 1 except that about 0.5 wt % of sulfate aqueous solution was used as the second aqueous solution, instead of about 0.5 wt % of phosphate solution, in the step of forming the second dielectric layer 22. The aforesaid sulfate aqueous solution is one of examples of the second aqueous solution containing sulfate ion.

Comparative Example 5

In Comparative Example 5, a solid electrolytic capacitor X5 was fabricated in the same manner as in Example 1 except that the step of forming the first dielectric layer 21 of Example 1 was omitted and about 0.5 wt % of sulfate aqueous solution used in Example 4 was used as the second aqueous solution and the time for the anodic oxidation was changed to about 10 hours in the step of forming the second dielectric layer 22. In other words, a dielectric layer was composed of only the second dielectric layer in the solid electrolytic capacitor X5 of Comparative Example 5.

In the solid electrolytic capacitor D of Example 4, at the stage of forming the dielectric layer 2 composed of the first dielectric layer 21 and the second dielectric layer 22 for covering the circumference of the anode 1, the dielectric layer 2 was analyzed by ESCA (Electron Spectroscopy for Chemical Analysis). The results are shown in FIG. 7. In FIG. 7, vertical axis shows content of the elements in the anode 1 and the dielectric layer 2 and horizontal axis shows sputtering time. The sputtering time is proportional to the position in the thickness direction and the sputtering depth per minute of the sputtering time is about 10 nm.

As shown in FIG. 7, the dielectric layer 2 of the solid electrolytic capacitor D of Example 4 is composed of niobium oxide whose major component is niobium (Nb) and oxygen (O). In other words, the dielectric layer 2 contains niobium (Nb) and oxygen (O) and is composed of niobium oxide whose major component is one element of either of niobium (Nb) or oxygen (O).

In the dielectric layer 2, three regions (i), (ii) and (iii) exist in the order from the face side (the opposite side of the anode).

The region (i) of the face side of the dielectric layer 2 where the electrolyte layer 3 is formed is 1 nm thick containing niobium and oxygen and composed of niobium oxide whose major component is oxygen. Further, in the region (i), about 2.5 atomic % at the maximum of sulfur (S) is contained while about 0.5 or less atomic % of fluorine (F) is contained. As a result, the region (i) is conceivably the second dielectric layer 22. In the region (i), sulfur (S) concentration becomes higher in the face side and becomes lower toward the anode 1 side.

The region (ii) is on inside of the region (i) (the anode 1 side). The region (ii) is 15 nm thick containing niobium and oxygen and composed of niobium oxide whose major component is oxygen. The region (iii) is on the inside of the region (ii). The region (iii) is 11 nm thick containing niobium and oxygen and composed of niobium oxide whose major component is niobium.

Fluorine (F) is contained in both of the region (ii) and the region (iii) while sulfur (S) is not contained therein. Therefore, the regions (ii) and (iii) are conceivably the first dielectric layer 21. In the region (ii), fluorine (F) is contained at almost uniform concentration of about 0.5 atomic % to depth direction. On the other hand, in the region (iii), the fluorine concentration is increased from the region (ii) side toward the anode 1 side. Thus, the fluorine concentration in the first dielectric layer 21 composed of the regions (ii) and (iii) is increased from the region (i) side toward the anode 1 side. Further, as the region (iii) contains about 1.8 atomic % at the maximum of fluorine, the region (iii) conceivably contains niobium fluoride. Still further, fluorine (F) inside of the anode 1 is conceivably diffused from the first dielectric layer 21 composed of the regions (ii) and (iii).

Next, as the same manner in Example 1, leakage current after heat-treatment and equivalent series resistance (ESR) at about the frequency of 100 kHz were determined in each of the solid electrolytic capacitor D of Example 4 and the solid electrolytic capacitor X5 of Comparative Example 5. Further, the numbers of leakage current and ESR in each of the solid electrolytic capacitors D and X5 was determined on the basis of the determined leakage current and ESR in the solid electrolytic capacitor A of Example 1 defined as 100. The results are shown in Table 4 below.

TABLE 4

| | leakage current | ESR |
|---|---|---|
| solid electrolytic capacitor D | 105 | 100 |
| solid electrolytic capacitor X5 | 1200 | 200 |
| solid electrolytic capacitor A | 100 | 100 |

As shown in the table 4, the leakage current of the solid electrolytic capacitor X5 of Comparative Example 5 was generated about twelve times as much as that of the solid electrolytic capacitor A of Example 1. In contrast, as the same as the solid electrolytic capacitor A of Example 1, the leakage current of the solid electrolytic capacitor D of Example 4 was notably decreased as compared with the solid electrolytic capacitors X1 to X5 of Comparative Examples 1 to 5. As a result, it was found out that in cases where sulfur was contained in the second dielectric layer 22 located on the face side of the dielectric layer 2 had the effect of decreasing the leakage current as the same as the solid electrolytic capacitor A of Example 1 wherein phosphorus was contained in the second dielectric layer 22.

Further, as the same as the solid electrolytic capacitor A of Example 1, ESR in the solid electrolytic capacitor D of Example 4 was notably decreased as compared with ESR in each of the solid electrolytic capacitors X2 to X5 of Comparative Examples 2 to 5 wherein the dielectric layer containing fluorine was not formed.

In the solid electrolytic capacitor A of Example 1 and the solid electrolytic capacitor D of Example 4, the first dielectric layer 21 and the second dielectric layer 22 were composed of the region (iii) of niobium oxide whose major component was niobium and the regions (i) and (ii) of niobium oxide whose major component was oxygen. It should be construed, however, that the solid electrolytic capacitor according to the present invention is not limited to the above description. In the present invention, for example, the all regions may be composed of niobium oxide whose major component is oxygen or the region (iii) may be composed of the niobium oxide whose major component is oxygen and the regions (i) and (ii) maybe composed of niobium oxide whose major component is niobium.

Figure 1:
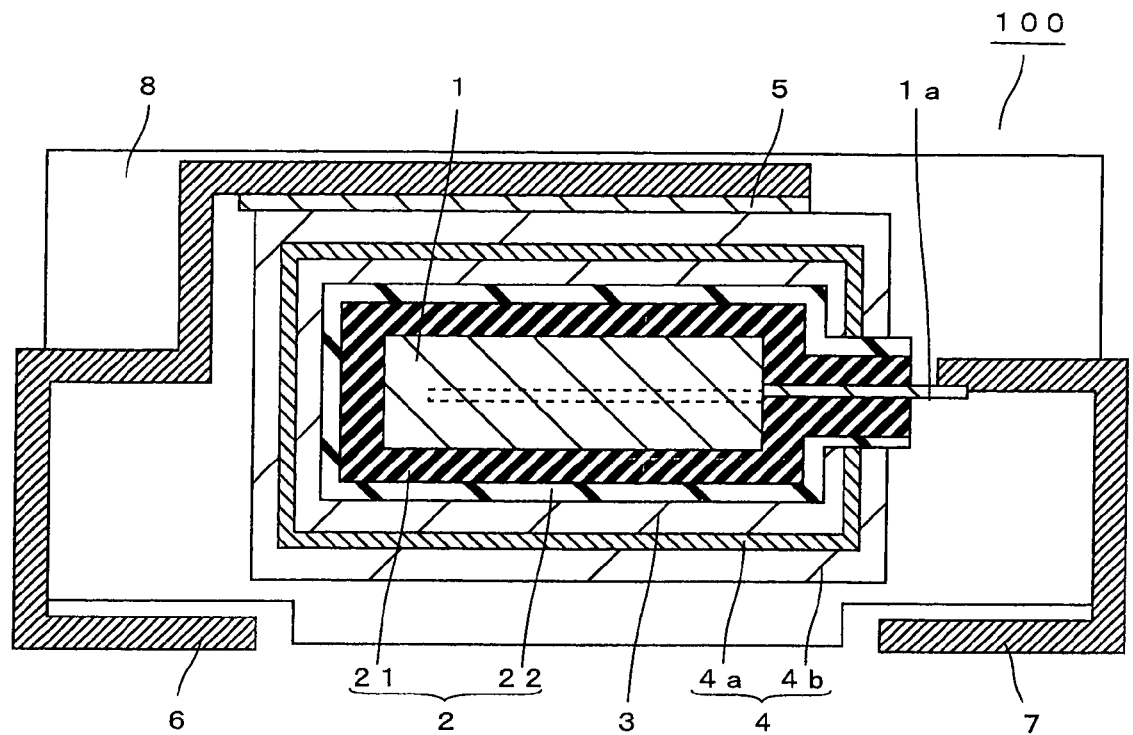
[FIG. 1]
Figure 2:
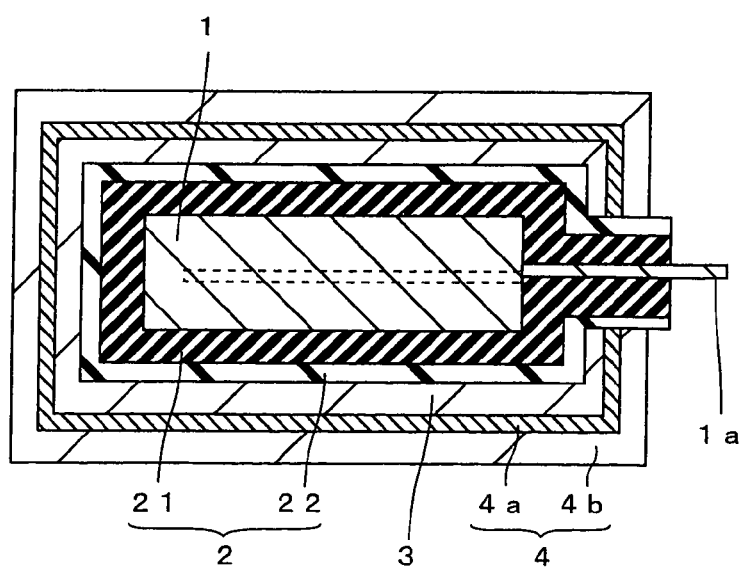
Figure 3:
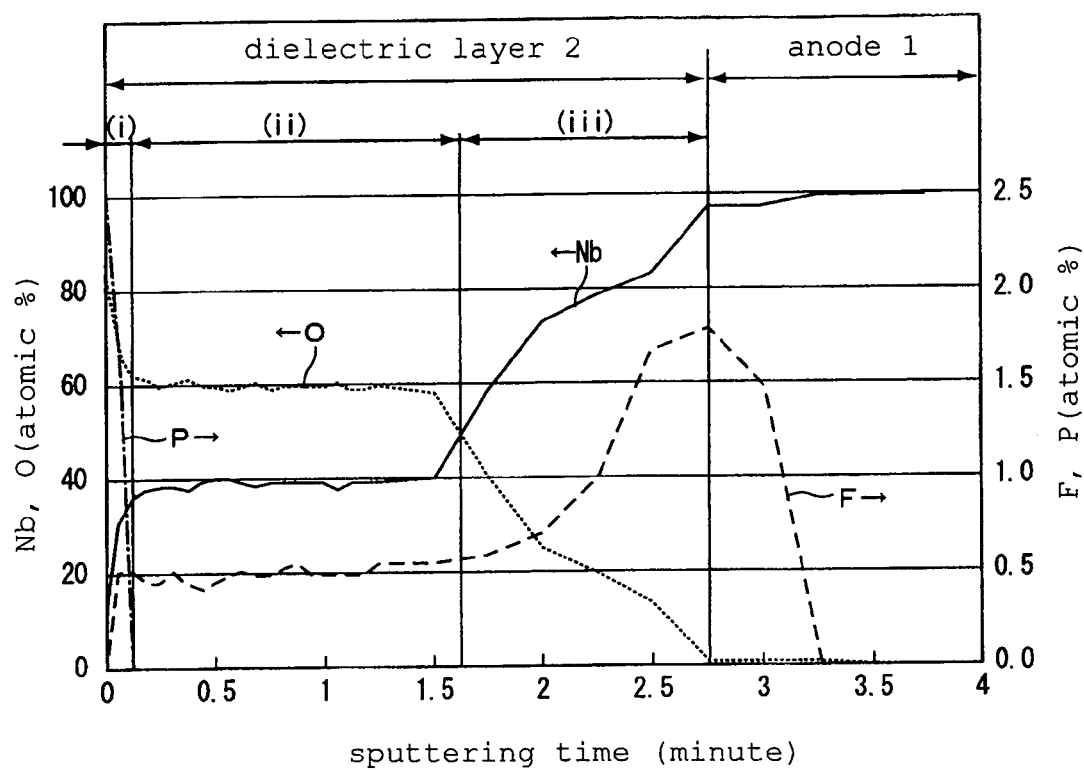
Figure 4:
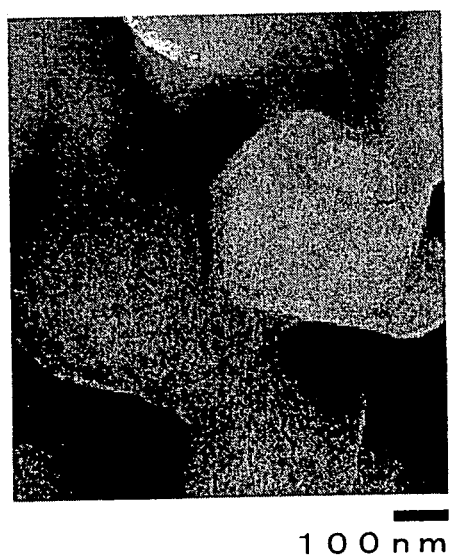
Figure 5:
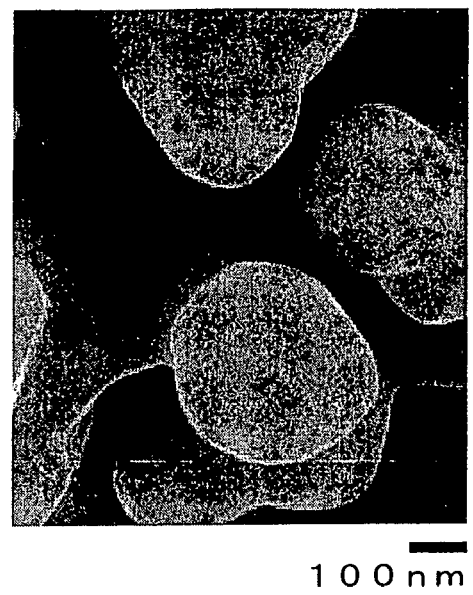
Figure 6:
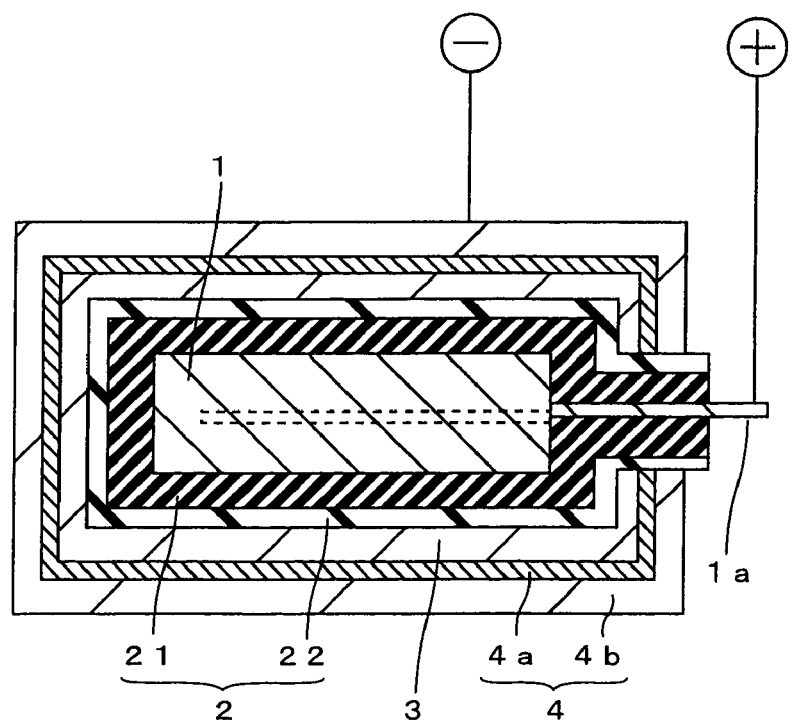
Figure 7:
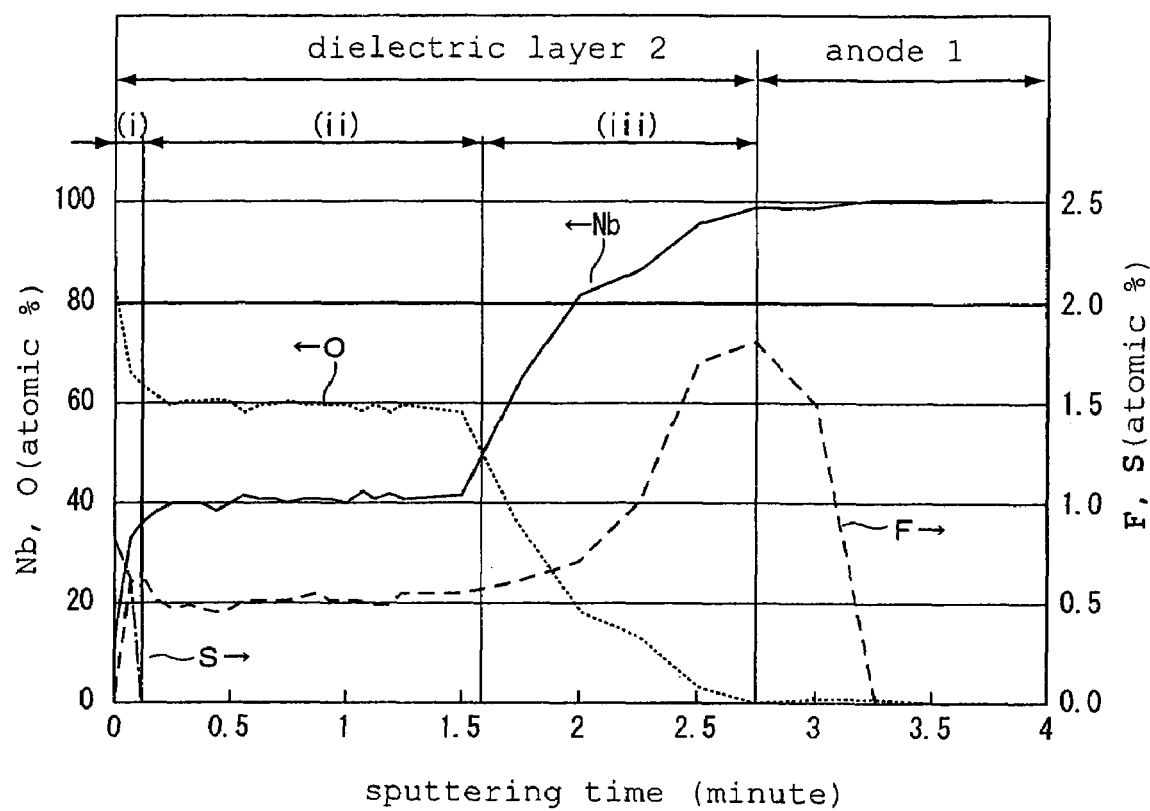

This drawing shows a structural cross-sectional view of a solid electrolytic capacitor according to an embodiment of the present invention.

[FIG. 2]

This drawing shows a structural cross-sectional view of a solid electrolytic capacitor according to Example 1 of the present invention.

[FIG. 3]

This drawing is a graph showing results obtained by the analysis by ESCA of the solid electrolytic capacitor according to Example 1 of the present invention.

[FIG. 4]

This drawing is a SEM photograph showing a surface of a dielectric layer after a second dielectric layer is formed thereon in Example 1 of the present invention.

[FIG. 5]

This drawing is a SEM photograph showing the surface of the dielectric layer after the second dielectric layer is formed thereon in Comparative Example 2 of the present invention.

[FIG. 6]

This drawing is a typical figure showing a method for determining leakage current of the solid electrolytic capacitor according to Example 1 of the present invention.

[FIG. 7]

This drawing is a graph showing results obtained by the analysis by ESCA of a solid electrolytic capacitor according to Example 4 of the present invention.

DESCRIPTION OF REFERENCE NUMERALS 1 anode
1a anode lead
2 dielectric layer
21 first dielectric layer
22 second dielectric layer
3 electrolyte layer
4 cathode
4a first conducting layer
4b second conducting layer
5 conducting adhesive layer
6 cathode terminal
7 anode terminal
8 mold outer resin
100 solid electrolytic capacitor

What is claimed is:

1. A solid electrolytic capacitor comprising:
   an anode formed of niobium or niobium alloy;
   a first dielectric layer containing niobium and oxygen whose major component is niobium or oxygen formed on the anode;
   a second dielectric layer containing phosphorus or sulfur in addition to niobium and oxygen formed on the first dielectric layer;
   and a cathode formed on the second dielectric layer.

2. The solid electrolytic capacitor as claimed in claim 1, wherein
   fluorine is contained in the first dielectric layer.

3. The solid electrolytic capacitor as claimed in claim 2, wherein
   fluorine concentration contained in the first dielectric layer is increased toward the anode side from the cathode side.

4. The solid electrolytic capacitor as claimed in claim 1, wherein
   an electrolyte layer is provided between the second dielectric layer and the cathode.

5. A fabrication method for solid electrolytic capacitor comprising the steps of:
   forming a first dielectric layer whose major component is niobium or oxygen by anodizing an anode formed of niobium or niobium alloy in a first aqueous solution;
   forming a second dielectric layer containing phosphorus or sulfur in addition to niobium and oxygen on the first dielectric layer by anodizing the anode formed with the first dielectric layer in a second aqueous solution containing phosphate ion or sulfate ion;
   and forming a cathode on the second dielectric layer.

6. The fabrication method for solid electrolytic capacitor as claimed in claim 5, wherein
   fluoride ion is contained in the first aqueous solution.

7. A fabrication method for solid electrolytic capacitor comprising the steps of:
   forming a first dielectric layer containing niobium and oxygen whose major component is niobium or oxygen by anodizing an anode formed of niobium or niobium alloy in a first aqueous solution;
   forming a second dielectric layer containing phosphorus or sulfur in addition to niobium and oxygen on the first dielectric layer by anodizing the anode formed with the first dielectric layer in a second aqueous solution containing phosphate ion or sulfate ion;
   forming an electrolyte layer on the second dielectric layer;
   and forming a cathode on the electrolyte layer.

8. The fabrication method for solid electrolytic capacitor as claimed in claim 7, wherein
   fluoride ion is contained in the first aqueous solution.

* * * * *